US012631658B2

(12) United States Patent
Tian et al.

(10) Patent No.: US 12,631,658 B2
(45) Date of Patent: May 19, 2026

(54) FULL-AUTOMATIC WESTERN BLOT PROCESSING SYSTEM

(71) Applicant: WIX TECHNOLOGY (BEIJING) CO., LTD, Beijing (CN)

(72) Inventors: Chenghao Tian, Beijing (CN); Peiyuan Ma, Beijing (CN); Taiping Yang, Beijing (CN); Xueyuan Li, Beijing (CN)

(*) Notice: Subject to any disclaimer, the term of this patent is extended or adjusted under 35 U.S.C. 154(b) by 541 days.

(21) Appl. No.: 18/266,795

(22) PCT Filed: Jan. 5, 2021

(86) PCT No.: PCT/CN2021/070247
§ 371 (c)(1),
(2) Date: Jun. 12, 2023

(87) PCT Pub. No.: WO2022/126803
PCT Pub. Date: Jun. 23, 2022

(65) Prior Publication Data
US 2024/0044927 A1     Feb. 8, 2024

(30) Foreign Application Priority Data

Dec. 15, 2020    (CN) .......................... 202011482060.3

(51) Int. Cl.
*G01N 35/04*     (2006.01)
*G01N 35/00*     (2006.01)

(52) U.S. Cl.
CPC ... *G01N 35/04* (2013.01); *G01N 2035/00356* (2013.01); *G01N 2035/00524* (2013.01); *G01N 2035/0091* (2013.01); *G01N 2035/0434* (2013.01)

(58) Field of Classification Search
CPC .......... G01N 2035/00346; G01N 2035/00356; G01N 2035/00524; G01N 2035/0091; G01N 2035/0434; G01N 33/68; G01N 35/00; G01N 35/04; G01N 35/1083
See application file for complete search history.

(56) References Cited

FOREIGN PATENT DOCUMENTS

| | | |
|---|---|---|
| CN | 109100502 A | 12/2018 |
| CN | 208506052 U | 2/2019 |
| WO | WO-2021033209 A1 * | 2/2021 ............. G01N 1/312 |

* cited by examiner

*Primary Examiner* — Jennifer Wecker

(57)     ABSTRACT

Disclosed in the present invention is a full-automatic western blot processing system, comprising a housing, and further comprising: an incubation shaker mounted in the housing; a constant-temperature unit mounted in the housing; a membrane box chamber configured to carry a membrane box body and provided on the incubation shaker; a pipetting unit mounted on the incubation shaker and configured to complete pipetting, liquid addition, and liquid discharge in the membrane box body; a control unit mounted in the housing, the incubation shaker, the constant-temperature unit and the pipetting unit being all connected to the control unit, and the control unit being electronically connected to a mains supply; and a human-computer interaction unit mounted on the surface of the housing and connected to the control unit.

8 Claims, 6 Drawing Sheets

FULL-AUTOMATIC WESTERN BLOT PROCESSING SYSTEM

FIELD OF THE INVENTION

The invention relates to the technical field of western blot processing system, specifically relating to a full-automatic western blot processing system.

BACKGROUND OF THE INVENTION

Western blot is a commonly used experimental method in molecular biology, biochemistry and immunogenetics, the basic principle of which is to stain a gel electrophoresis-treated cell or biological tissue sample with specific antibody. Obtaining information expressed by specific protein in the analyzed cell or tissue via analyzing the location and depth of staining.

Western Blot is a protein detection technology which transfers the total protein of cell or tissue after electrophoretic separation from gel to solid-phase support NC Membrane or PVDF membrane, then specific antibody (reagent) is utilized to detect specific antigen, being widely used in multiple aspects such as study of gene expression in protein level, antibody activity detection and early disease diagnosis at present.

For Western Blot, the reaction between the membrane and specific antibody (reagent) needs to go through blocking, reagent adding, reagent recovery, waste liquid recovery, cleaning and other processes, during the process of which constant shaking and mixing are needed and each process needs large number of manual work, complicated and tedious.

SUMMARY OF THE INVENTION

In order to achieve above mentioned purposes, the invention discloses a full-automatic western blot processing system, comprising a housing, and further comprising:

An incubation shaker mounted in the housing;

A constant-temperature unit mounted in the housing;

A membrane box chamber configured to carry a membrane box body and provided on the incubation shaker;

A pipetting unit mounted on the incubation shaker and configured to complete pipetting, liquid addition, and liquid discharge in the membrane box body;

A control unit mounted in the housing, the incubation shaker, the constant-temperature unit and the pipetting unit being all connected to the control unit, and the control unit being electronically connected to a mains supply;

A human-computer interaction unit mounted on the surface of the housing and connected to the control unit.

Preferably, the human-computer interaction unit is an LCD touch screen.

Preferably, the membrane box body is formed by integrally combining a membrane box, a primary antibody placing box and a secondary antibody placing box, and the primary antibody placing box and the secondary antibody placing box are mounted at one end of the membrane box in parallel.

Preferably, the membrane box comprises:

A membrane box body chamber, wherein a plurality of membrane box placing grooves with uniform groove width are reserved on the membrane box body, the membrane box placing grooves are arranged according to different widths of membrane box bodies, the widths of the membrane box bodies with different specifications are increased in multiples, and the adaptive membrane box placing grooves are occupied according to the requirement of preset number;

The membrane box chamber upper cover is arranged on the membrane box chamber body.

Preferably, the pipetting unit comprises:

A pipetting fixing frame erected above the membrane box chamber;

A horizontal motor holder arranged on the pipetting fixing frame;

A horizontal driven wheel holder arranged on the pipetting fixing frame, and the horizontal driven wheel holder is arranged in parallel with the horizontal motor holder;

Horizontal synchronous wheels arranged on the horizontal driven wheel holder;

Horizontal synchronous belts sleeved on the two horizontal synchronous wheels;

A horizontal linear guide rail arranged on the pipetting fixing frame;

A horizontal sliding block connected to the horizontal linear guide rail in a sliding manner and is connected with the horizontal synchronous belt;

A horizontal motor mounted on the horizontal motor holder, and the output end of the horizontal motor is connected with the horizontal synchronous wheel; said horizontal motor is connected with the control unit;

A vertical motor holder mounted on the horizontal sliding block;

Vertical synchronous belt wheels mounted on the vertical motor holder;

A vertical synchronous belt sleeved on the two vertical synchronous belt wheels;

A vertical guide rail mounted on the vertical motor holder;

A vertical sliding block connected to the vertical guide rail in a sliding manner and is connected with the vertical synchronous belt;

A lifting support mounted on the vertical sliding block;

A pin holder mounted on the lifting support;

A pipeline mounted on the pin holder;

A vertical motor mounted on the vertical motor holder, and the output end of the vertical motor is connected with one of vertical synchronous belt wheels; said vertical motor is connected with the control unit;

A grooved optocoupler mounted on the vertical motor holder along the walking direction of the horizontal sliding block, and is positioned below the pin holder; said optocoupler is connected with the control unit;

Preferably, said incubation shaker comprises:

A fixing plate installed in the housing;

A rocking plate installed on the fixing plate through limiting shafts, four said limiting shafts distributed close to the corner of the fixing plate and the membrane box chamber is placed on the rocking plate;

A primary reduction wheel installed at the bottom of the rocking plate;

A rocking motor mounted on the side end of the rocking plate via rocking motor mounting frame; said rocking motor is connected with the control unit;

A small belt wheel mounted on the output end of the rocking motor;

An eccentric shaft mounted on the fixing plate via bearing mounting frame;

A speed measuring coded disc and a secondary reduction wheel coaxially arranged on the eccentric shaft;

Round belts respectively sleeved on the secondary reduction wheel, the primary reduction wheel and said small belt wheel;

An optocoupler installed on the rocking motor mounting frame; said optocoupler is close to the speed measuring coded disc, said optocoupler is connected with the control unit.

Preferably, said constant-temperature unit embedded at the bottom of the membrane box chamber; said constant-temperature unit includes:

A heat conducting plate embedded at the bottom of the membrane box chamber;

Semiconductor chilling plates arranged at the bottom end of the heat conducting plate side by side and connected with the control unit;

A temperature sensor arranged in the membrane box chamber and connected with the control unit;

A water cooling unit installed at the bottom of semiconductor chilling plate for the heat transfer with the semiconductor chilling plate, said water cooling unit is connected with the control unit.

Preferably, a gas-liquid separator is installed at the rear end of the pipeline and the rear end of the gas-liquid separator is integrally connected with a pipeline with an exhaust pump, a pipeline with a washing pump and a pipeline with an inflating pump; said gas-liquid separator, said pipeline with the exhaust pump, said pipeline with the washing pump and said pipeline with the inflating pump are all connected with the control unit.

Preferably, a chamber door is arranged on the housing opposite to the membrane box chamber.

BRIEF DESCRIPTION OF THE DRAWINGS

In order to illustrate the preferred embodiment of the invention or the technical scheme more clearly, the technical scheme of the preferred embodiment or the figures required by the prior art is further described briefly. Obviously, only partial embodiments of the invention are shown and the actual structure is not limited thereto. It is to be understood by those skilled in the art that other drawings can be obtained based on the drawings of the invention with non-creative labor.

As is shown in the figures, 1. housing, 2. incubation shaker, 3. constant-temperature unit, 4. membrane box chamber, 5. pipetting unit; 6. membrane box body; 7. control unit; 8. human-computer interaction unit; 21. fixing plate; 22. limiting shaft; 23. rocking plate; 24. primary reduction wheel; 26. small belt wheel; 27. rocking motor; 28. round belt; 29. speed measuring coded disc; 210. eccentric shaft; 211. secondary reduction wheel; 212. optocoupler; 50. horizontal driven wheel holder; 51. horizontal motor holder; 52. horizontal synchronous wheel; 53. horizontal synchronous belt; 54. horizontal linear guide rail; 55. horizontal sliding block; 56. horizontal motor; 57. vertical synchronous belt wheel; 58. vertical synchronous belt; 59. vertical motor holder; 510. vertical guide rail; 511. vertical sliding block; 512. lifting support; 513. pin holder; 514. pipeline; 515. vertical motor; 516. grooved optocoupler.

DETAILED DESCRIPTION OF THE PREFERRED EMBODIMENTS

The technical scheme of the invention is further described clearly and detailedly hereinafter with reference to the drawings. Obviously, only partial embodiments of the invention are shown and the actual structure is not limited thereto. All other embodiments, which can be obtained by those skilled in the art without making any creative effort based on the embodiments in the present invention, shall all fall within the protective scope of the invention.

Embodiments

The invention is further described in detail hereinafter with reference to the drawings.

Figure 1:
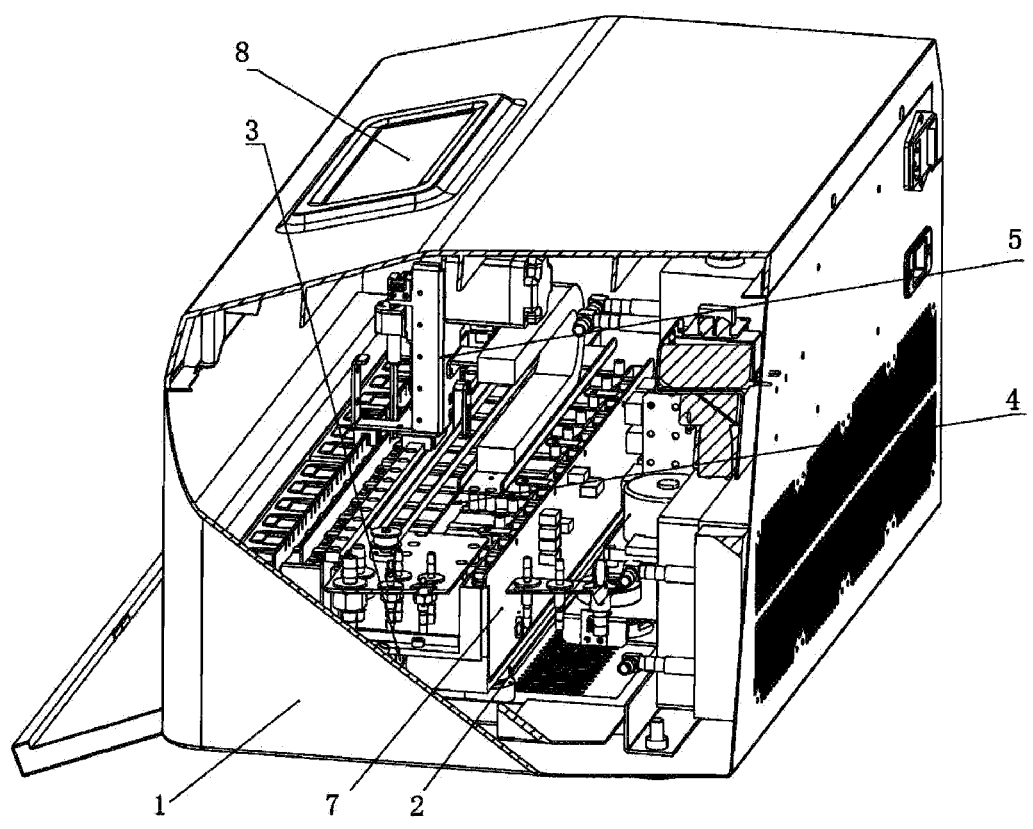
FIG. 1 is the structural diagram of the invention.
Figure 2:
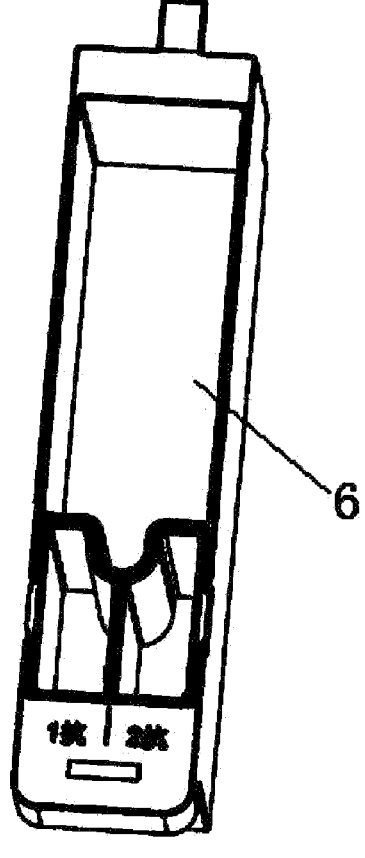
FIG. 2 is the structural diagram of the membrane box body in the invention.
Figure 3:
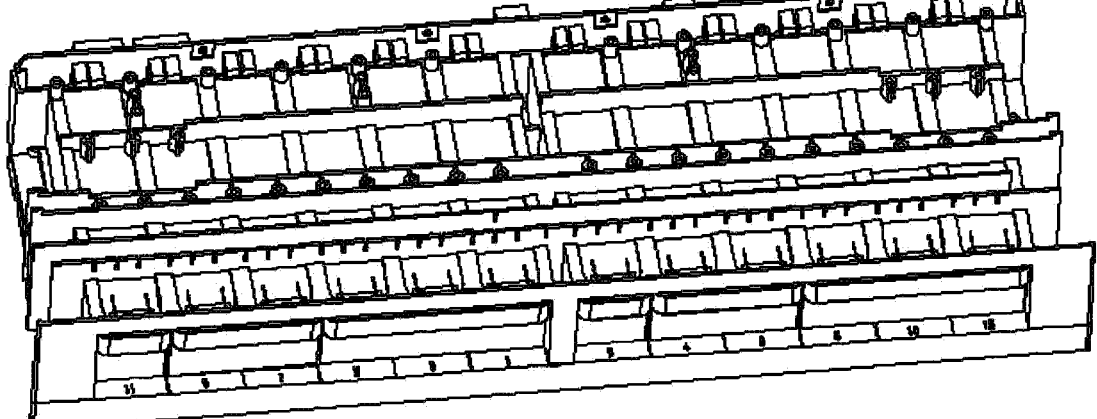
FIG. 3 is the axonometric drawing of the membrane box chamber of the invention.
Figure 4:
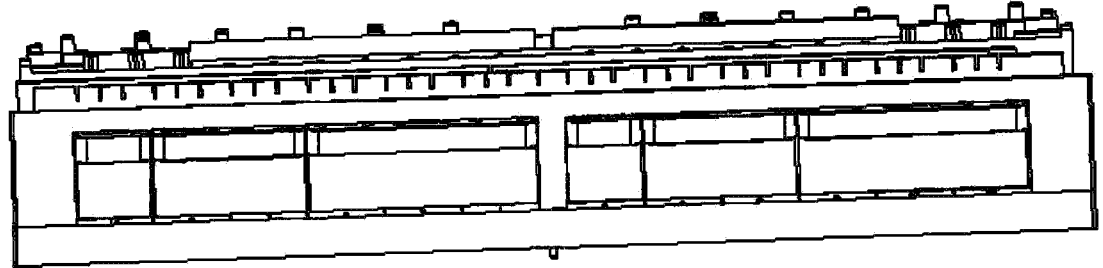
FIG. 4 is the front view of the membrane box chamber of the invention.
Figure 5:
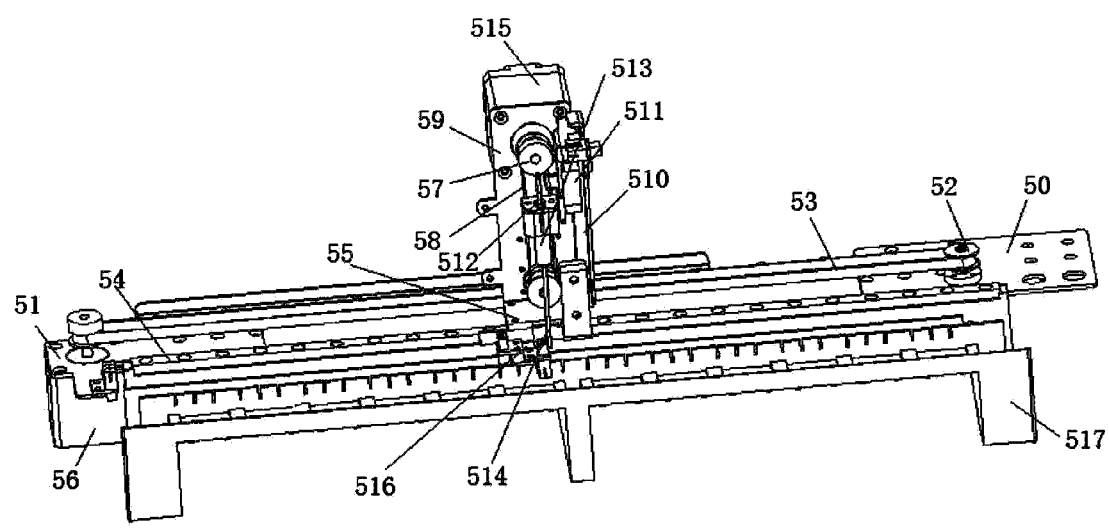
FIG. 5 is the structural diagram of the pipetting unit of the invention.
Figure 6:
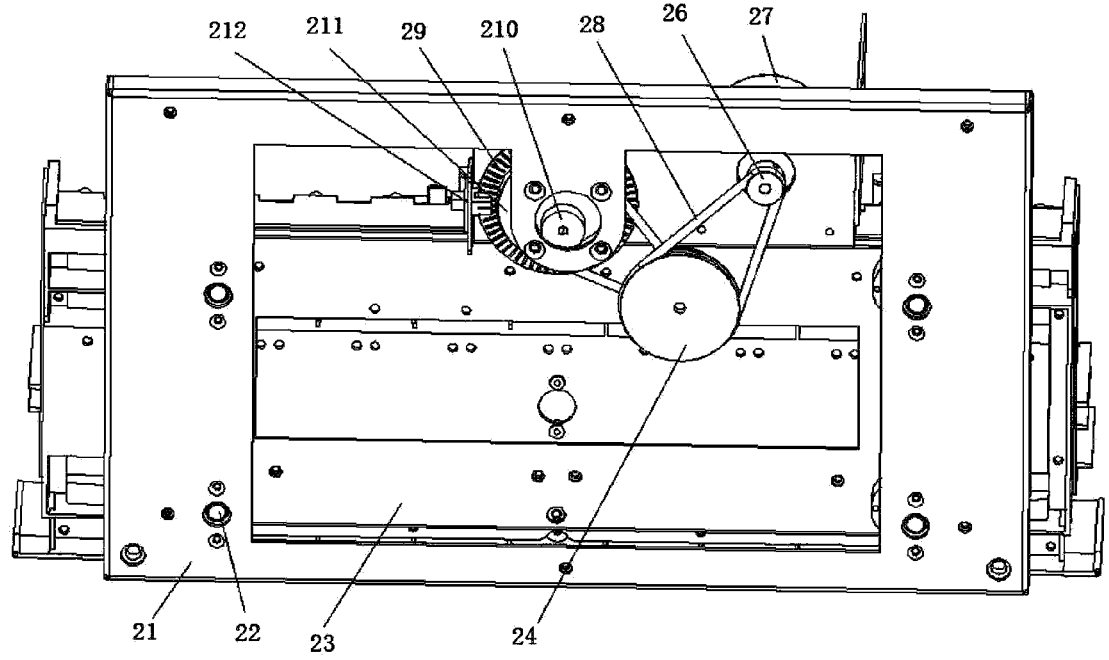
FIG. 6 is the bottom view of the incubation shaker of the invention.

As is shown from FIG. 1 to FIG. 6, the invention discloses a full-automatic western blot processing system, comprising a housing 1, and further comprising:

An incubation shaker 2 mounted in the housing 1;

A constant-temperature unit 3 mounted in the housing 1;

A membrane box chamber 4 configured to carry a membrane box body 6 and provided on the incubation shaker 2;

A pipetting unit 5 mounted on the incubation shaker 2 and configured to complete pipetting, liquid addition, and liquid discharge in the membrane box body 6;

A control unit 7 mounted in the housing 1, the incubation shaker 2, said constant-temperature unit 3 and said pipetting unit 5 being all connected to the control unit 7, and the control unit 7 being electronically connected to a mains supply;

A human-computer interaction unit 8 mounted on the surface of the housing 1 and connected to the control unit 7.

Wherein, said human-computer interaction unit 8 is an LCD touch screen.

Wherein, said membrane box body 6 is formed by integrally combining a membrane box, a primary antibody placing box and a secondary antibody placing box, and the primary antibody placing box and the secondary antibody placing box are mounted at one end of the membrane box in parallel.

Wherein, the membrane box 4 comprises:

A membrane box body chamber, wherein a plurality of membrane box placing grooves with uniform groove width are reserved on the membrane box body, the membrane box placing grooves are arranged according to different widths of membrane box bodies 6, the widths of the membrane box bodies 6 with different specifications are increased in multiples, and the adaptive membrane box placing grooves are occupied according to the requirement of preset number;

The membrane box chamber upper cover is arranged on the membrane box chamber body.

Wherein, said pipetting unit 5 comprises:

A pipetting fixing frame 517 erected above the membrane box chamber 4;

A horizontal motor holder 51 arranged on the pipetting fixing frame 517;

A horizontal driven wheel holder 50 arranged on the pipetting fixing frame 517, and the horizontal driven wheel holder 50 is arranged in parallel with the horizontal motor holder 51;

Two horizontal synchronous wheels 52 arranged on the horizontal driven wheel holder 50 respectively;

Horizontal synchronous belts 53 sleeved on the two horizontal synchronous wheels 52;

A horizontal linear guide rail 54 arranged on the pipetting fixing frame 517;

A horizontal sliding block 55 connected to the horizontal linear guide rail 54 in a sliding manner and is connected with the horizontal synchronous belt 53;

A horizontal motor 56 mounted on the horizontal motor holder 51, and the output end of the horizontal motor 56 is connected with the horizontal synchronous wheel 52; said horizontal motor 56 is connected with the control unit 7;

A vertical motor holder 59 mounted on the horizontal sliding block 55;

Two vertical synchronous belt wheels 57 mounted on the vertical motor holder 59;

A vertical synchronous belt 58 sleeved on the two vertical synchronous belt wheels 57;

A vertical guide rail 510 mounted on the vertical motor holder 59;

A vertical sliding block 511 connected to the vertical guide rail 510 in a sliding manner and is connected with the vertical synchronous belt 58;

A lifting support 512 mounted on the vertical sliding block 511;

A pin holder 513 mounted on the lifting support 512;

A pipeline 514 mounted on the pin holder 513;

A vertical motor 515 mounted on the vertical motor holder 59, and the output end of the vertical motor 515 is connected with one of vertical synchronous belt wheels 57; said vertical motor 515 is connected with the control unit 7;

A grooved optocoupler 516 mounted on the vertical motor holder 59, and is positioned below the pin holder 513; said optocoupler 516 is connected with the control unit 7;

Wherein, said incubation shaker 2 comprises:

A fixing plate 21 installed in the housing 1;

A rocking plate 23 installed on the fixing plate through limiting shafts 22, four said limiting shafts 22 distributed close to the corner of the fixing plate 21 and the membrane box chamber 4 is placed on the rocking plate 23;

A primary reduction wheel 24 installed at the bottom of the rocking plate 23;

A rocking motor 27 mounted on the side end of the rocking plate 23 via rocking motor mounting frame; said rocking motor 27 is connected with the control unit 7;

A small belt wheel 26 mounted on the output end of the rocking motor 27;

An eccentric shaft 210 mounted on the fixing plate 21 via bearing mounting frame;

A speed measuring coded disc 29 and a secondary reduction wheel 211 coaxially arranged on the eccentric shaft 210;

Round belts 28 respectively sleeved on the secondary reduction wheel 211, the primary reduction wheel 24 and said small belt wheel 26;

An optocoupler 212 installed on the rocking motor mounting frame; said optocoupler 212 is close to the speed measuring coded disc 212, said optocoupler 212 is connected with the control unit 7.

Wherein, said constant-temperature unit 3 embedded at the bottom of the membrane box chamber 4; said constant-temperature unit 3 includes:

A heat conducting plate embedded at the bottom of the membrane box chamber 4;

Semiconductor chilling plates arranged at the bottom end of the heat conducting plate side by side and connected with the control unit 7;

A temperature sensor arranged in the membrane box chamber 4 and connected with the control unit 7;

A water cooling unit installed at the bottom of semiconductor chilling plate for the heat transfer with the semiconductor chilling plate, said water cooling unit is connected with the control unit 7.

Wherein, a gas-liquid separator is installed at the rear end of the pipeline 514 and the rear end of the gas-liquid separator is integrally connected with a pipeline with an exhaust pump, a pipeline with a washing pump and a pipeline with an inflating pump; said gas-liquid separator, said pipeline with the exhaust pump, said pipeline with the washing pump and said pipeline with the inflating pump are all connected with the control unit 7. Functions such as pipetting, liquid addition, and liquid discharge for different membrane box bodies (including corresponding antibody) are realized by coordinating with pipetting unit 5.

Wherein, a chamber door is arranged on the housing 1 opposite to the membrane box chamber 4.

The working principle and advantageous effects of the invention is as follow:

The invention discloses a full-automatic western blot processing system characterized in that it supports simultaneous operation of multiple channels and membrane box bodies 6 with different width specifications can be used in combination at will; the membrane box bodies 6 integrates the membrane and supplementary reagents into one; the membrane box body is suitable for different sizes of membranes and is provided with three different sizes; The membrane box 4 can automatically identify the type of the membrane box bodies 6 via sensor; The constant-temperature unit 3 ensures the samples in membrane box body 6 to react under given temperature; the pipetting unit 5 drives the pipeline to move and enable the pipeline to reach the location of any membrane box body 6 (including corresponding antibody) accurately; controlling the incubation shaker drives the membrane box chamber 4 to shake in a constant speed and provides necessary condition for western blot; the adding, discharge, and shifting of all types of liquid is realized by cooperation among a plurality of diaphragm pumps, solenoid valves and gas-liquid separators; the control unit 7 coordinates with the human-computer interaction unit 8 to provide programming, monitoring and other human-computer interactions for its users.

The membrane box body 6 of above mentioned scheme is formed by integrally combining a membrane box, a primary antibody placing box and a secondary antibody placing box. In the using process, the primary antibody placing box and secondary antibody placing box can be fixed in the membrane box body 6 accurately so as to form an integral whole. The full-automatic western blot processing system supports membrane box bodies 6 with three different width sizes and three sample boxes can be matched and used at will.

The membrane box chamber 4 in the above-mentioned scheme comprises plastic housing and insulation material, the main function of which is to effectively fix the membrane box body 6 and drive it to wave under the effect of incubation shaker 2, and to provide function of good heat preservation and shelter (dust proof, prevent evaporation, light proof) for the membrane box body 6 simultaneously. According to the invention, a plurality of channel type membrane box placing grooves are divided in the membrane box chamber 4, the width of the membrane box placing groove is designed based on the size of the minimum membrane box body 6, and the membrane box placing grooves are arranged side by side. The transverse dimensions of the rest membrane box bodies 6 except the smallest one are designed into different integral multiples of the smallest membrane box body 6 (namely, the dimensions can occupy 2 or 3 . . . positions of the smallest membrane box body 6), so that the membrane boxes can be placed into the channel under the premise of occupying a plurality of channels. The design not only can fully utilize the area of the channel type membrane box placing grooves, but also can maximize the number of available channels under the condition that the membrane box areas are the same, and simultaneously supports the flexible combined use of the membrane box bodies 6 with different sizes. The outer membrane box chamber 4 is also provided with a sensor for detecting the type and the existence of the membrane box body 6 and realizing automatically identifying the type of the membrane box body 6 and the occupied channel number thereof.

The specific implementation method of the full-automatic western blot processing system is as follow:

1. Placing the membrane into the membrane box body 6, and placing the antibody into the primary antibody placing box and the secondary antibody placing box;
2. Placing the membrane box body 6 into the membrane box chamber 4, and the type and the occupied channel position of the membrane box body 6 are automatically fed back to the LCD touch screen;
3. Setting program parameters through LCD touch screen;
4. After the operation is started, the constant-temperature unit 3 controls the temperature in the membrane box chamber 4 by controlling the semiconductor chilling plate and the water cooling unit, thereby controlling the temperature of the membrane box body 6. The incubation shaker 2 drives the membrane box chamber 4 to shake, thereby driving the membrane box body 6 to shake. the liquid route is set to perform different operations at a predetermined time according to a program, thereby realizing various liquid transfers. The pipetting unit 5 (end of liquid route) brings it exactly to the specified position.

It should be understood that the above embodiment is only for clarity of the invention, and the embodiment is not limited thereto. Other variations and modifications will be apparent to those skilled in the art in light of the above description. This need not be, nor should it be exhaustive of all embodiments. And obvious variations or modifications derived therefrom are intended to be within the scope of the invention.

The invention claimed is:

1. A full-automatic western blot processing system, comprising a housing (1), and further comprising: an incubation shaker (2) mounted in the housing (1); a constant-temperature unit (3) mounted in the housing (1); a membrane box chamber (4) configured to carry a membrane box body (6) and provided on the incubation shaker (2); a pipetting unit (5) mounted on the incubation shaker (2) and configured to complete pipetting, liquid addition, and liquid discharge in the membrane box body (6); a control unit (7) mounted in the housing (1), said incubation shaker (2), constant-temperature unit (3) and pipetting unit (5) each being connected to the control unit (7), and the control unit (7) being electronically connected to a mains supply; and a human-computer interaction unit (8) mounted on the surface of the housing (1) and connected to the control unit (7), wherein said membrane box body (6) is formed by integrally combining a membrane box, a primary antibody placing box and a secondary antibody placing box, and wherein the primary antibody placing box and the secondary antibody placing box are each mounted at one end of the membrane box in parallel.

2. The full-automatic western blot processing system of claim 1 wherein said human-computer interaction unit (8) is an LCD touch screen.

3. The full-automatic western blot processing system of claim 1 wherein the membrane box (4) comprises: a membrane box body chamber, wherein a plurality of membrane box placing grooves with uniform groove widths are disposed within the membrane box body, the membrane box placing grooves are arranged according to different widths of membrane box bodies (6), the widths of the membrane box bodies (6) with different specifications are increased in multiples, and the adaptive membrane box placing grooves are occupied according to the requirement of preset number; the membrane box chamber upper cover is arranged on the membrane box chamber body.

4. The full-automatic western blot processing system of claim 1 wherein said pipetting unit (5) comprises: a pipetting fixing frame (517) erected above the membrane box chamber (4); a horizontal motor holder (51) arranged on the pipetting fixing frame (517); a horizontal driven wheel holder (50) arranged on the pipetting fixing frame (517), and the horizontal driven wheel holder (50) arranged in parallel with the horizontal motor holder (51); horizontal synchronous wheels (52) arranged on the horizontal driven wheel holder (50) respectively; horizontal synchronous belts (53) sleeved on the two horizontal synchronous wheels (52); a horizontal linear guide rail (54) arranged on the pipetting fixing frame (517); a horizontal sliding block (55) connected to the horizontal linear guide rail (54) in a sliding manner and is connected with the horizontal synchronous belt (53); a horizontal motor (56) mounted on the horizontal motor holder (51), and the output end of the horizontal motor (56) is connected with the horizontal synchronous wheel (52); said horizontal motor (56) is connected with the control unit (7); a vertical motor holder (59) mounted on the horizontal sliding block (55); vertical synchronous belt wheels (57) mounted on the vertical motor holder (59); vertical synchronous belt (58) sleeved on the two vertical synchronous belt wheels (57); a vertical guide rail (510) mounted on the vertical motor holder (59) vertically; a vertical sliding block (511) connected to the vertical guide rail (510) in a sliding manner and is connected with the vertical synchronous belt (58); a lifting support (512) mounted on the vertical sliding block (511); a pin holder (513) mounted on the lifting support (512); a pipeline (514) mounted on the pin holder (513); a vertical motor (515) mounted on the vertical motor holder (59), and the output end of the vertical motor (515) is connected with one of vertical synchronous belt wheels (57); said vertical motor (515) is connected with the control unit (7); and a grooved optocoupler (516) mounted on the vertical motor holder (59), and is positioned below the pin holder (513); said optocoupler (516) is connected with the control unit (7).

5. The full-automatic western blot processing system of claim 1 wherein, said incubation shaker (2) comprises: a fixing plate (21) installed in the housing (1); a rocking plate (23) installed on the fixing plate through limiting shafts (22), four said limiting shafts (22) distributed close to the corner of the fixing plate (21) and the membrane box chamber (4) is placed on the rocking plate (23); a primary reduction wheel (24) installed at the bottom of the rocking plate (23); a rocking motor (27) mounted on the side end of the rocking plate (23) via rocking motor mounting frame; said rocking motor (27) is connected with the control unit (7); a small belt wheel (26) mounted on the output end of the rocking motor (27); an eccentric shaft (210) mounted on the fixing plate (21) via bearing mounting frame; a speed measuring coded disc (29) and a secondary reduction wheel (211) coaxially arranged on the eccentric shaft (210); round belts (28) respectively sleeved on the secondary reduction wheel (211), the primary reduction wheel (24) and said small belt wheel (26); and an optocoupler (212) installed on the rocking motor mounting frame; said optocoupler (212) arranged close to the speed measuring coded disc (212), and connected with the control unit (7).

6. The full-automatic western blot processing system of claim 1 wherein said constant-temperature unit (3) is embedded at the bottom of the membrane box chamber (4); said constant-temperature unit (3) includes: a heat conducting plate embedded at the bottom of the membrane box chamber (4); semiconductor chilling plates arranged at the bottom end of the heat conducting plate side by side and connected with the control unit (7); a temperature sensor arranged in the membrane box chamber (4) and connected with the control unit (7); and a water cooling unit installed at the bottom of semiconductor chilling plate for the heat transfer with the semiconductor chilling plate, said water cooling unit is connected with the control unit (7).

7. The full-automatic western blot processing system of claim 4 wherein a gas-liquid separator is installed at the rear end of the pipeline (514) and the rear end of the gas-liquid separator is integrally connected with each of a pipeline with an exhaust pump, a pipeline with a washing pump and a pipeline with an inflating pump; said gas-liquid separator, said pipeline with the exhaust pump, said pipeline with the washing pump and said pipeline with the inflating pump are all connected with the control unit (7).

8. The full-automatic western blot processing system of claim 1 wherein a chamber door is arranged on the housing (1) opposite to the membrane box chamber (4).

* * * * *